United States Patent [19]
Narayan et al.

[11] Patent Number: 5,900,013
[45] Date of Patent: May 4, 1999

[54] DUAL COMPARATOR SCHEME FOR DETECTING A WRAP-AROUND CONDITION AND GENERATING A CANCEL SIGNAL FOR REMOVING WRAP-AROUND BUFFER ENTRIES

[75] Inventors: Rammohan Narayan; Karthikeyan Muthusamy, both of Austin, Tex.

[73] Assignee: Advanced Micro Devices, Inc., Sunnyvale, Calif.

[21] Appl. No.: 08/690,381

[22] Filed: Jul. 26, 1996

[51] Int. Cl.[6] ...................................................... G06F 12/02
[52] U.S. Cl. ........................ 711/135; 711/217; 340/146.2; 364/736.5
[58] Field of Search ........................ 395/250; 340/146.2; 711/135, 217, 110; 364/736.5

[56] References Cited

U.S. PATENT DOCUMENTS

| | | |
|---|---|---|
| 4,044,338 | 8/1977 | Wolf . |
| 4,453,212 | 6/1984 | Gaither et al. . |
| 4,807,115 | 2/1989 | Torng . |
| 4,858,105 | 8/1989 | Kuriyama et al. . |
| 4,928,223 | 5/1990 | Dao et al. . |
| 5,053,631 | 10/1991 | Perlman et al. . |
| 5,058,048 | 10/1991 | Gupta et al. . |
| 5,129,067 | 7/1992 | Johnson . |
| 5,136,697 | 8/1992 | Johnson . |
| 5,226,126 | 7/1993 | McFarland et al. . |
| 5,226,130 | 7/1993 | Favor et al. . |
| 5,274,835 | 12/1993 | Wakatani ................................. 395/800 |
| 5,355,113 | 10/1994 | McClure ............................... 340/146.2 |
| 5,357,236 | 10/1994 | McClure ............................... 395/146.2 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan, 1996, 4 pages.

Primary Examiner—Parshotam S. Lall
Assistant Examiner—Gautam R. Patel
Attorney, Agent, or Firm—Conley, Rose & Tayon; B. Noel Kivlin

[57] ABSTRACT

A device and method for comparing cancel tags, and for canceling data from a finite wrap-around data buffer. The data buffer stores tag values that are continuous, or sequential. A cancel tag is used to cancel all tags with a value "greater-than" the cancel tag. In comparing cancel tags of a wrap-around buffer, however, the comparator must take into account wrap-around conditions. When a wrap-around condition occurs, tags that have a lower value may be "greater-than" the cancel tag. The present invention advantageously adds an additional bit to the tags stored in the data buffer and the cancel tag. The additional bit is toggled whenever a wrap-around condition occurs. By comparing the additional bit of the tag to the additional bit of the cancel tag, a wrap-around condition can be detected without extensive additional circuitry. The comparison of the additional bit indicates whether the comparator should cancel tags that are greater-than or less-than the cancel tag. The cancel tag causes the buffer pointer to change state and point to the storage element associated with the cancel tag, and causes the tag generator to change state.

14 Claims, 3 Drawing Sheets

DUAL COMPARATOR SCHEME FOR DETECTING A WRAP-AROUND CONDITION AND GENERATING A CANCEL SIGNAL FOR REMOVING WRAP-AROUND BUFFER ENTRIES

BACKGROUND OF THE INVENTION

1. Field of the Invention

This invention relates to tag comparators for buffers and, more particularly, to tag comparators for finite wrap-around buffers.

2. Description of the Relevant Art

A finite wrap-around buffer is a data storage device that stores data words of a fixed width. The buffer typically stores $2^n$ data words or entries. Each entry in the buffer stores a tag. The tags typically have a value between 0 to $2^{n-1}$. The tags are continuous, or sequential, and are typically generated by a n-bit incrementor. For example, if the buffer has sixteen entries, then the tags have a value from 0 to 15 and are generated by a four-bit incrementor. The tags, however, do not always start with 0 and may wrap-around in the buffer space. For example, the first entry in the buffer may store a tag of 11. The next entries would be continuous, i.e., tag values of 12, 13, 14, and 15. At this point, the tag has reached its maximum value of 15, and the tag wraps-around to 0, followed by 1, 2, 3 etc.

In some systems, a cancel operation deletes all tags in the buffer with a tag value "greater-than" a specific tag value (the specific tag value is called a cancel tag). The "greater-than" condition, however, must take in to account the wrap-around feature of the buffer. For example, if the tags range for 9 to 3 (i.e. 9, 10, 11, 12, 13, 14, 15, 0, 1, 2 and 3) and the cancel tag is 14, then tags 15, 0, 1, 2 and 3 would be canceled. In this case, 1 is considered "greater than" 14.

The first step in the conventional solution to determining which entries are "greater-than" the cancel tag is to determine if a wrap-around condition occurs in the buffer. If a wrap-around condition does exist, the tags before the wrap-around are canceled if they are greater-than the cancel tag, and the tags after the wrap-around are canceled if they are less-than the cancel tag. The process of detecting a wrap-around condition, however, takes up a significant amount of logic and introduces a significant delay. This delay may be critical in high frequency superscalar microprocessor designs.

A wrap-around buffer that supports a cancel operation without the overhead and delay of a typical wrap-around condition detector is thus desired.

SUMMARY OF THE INVENTION

The problems outlined above are in large part solved by an improved comparator scheme for a finite wrap-around buffer that adds another bit to the tag. The additional bit is toggled each time a wrap-around occurs. By comparing the additional bit of the tag to an additional bit of the cancel tag, it is easily determined whether a tag is before or after a wrap-around. The claimed invention eliminates the need for costly circuitry to detect a wrap-around condition. The claimed invention also reduces the propagation delay of a cancel operation and reduces the complexity of the routing.

The present invention contemplates a cancel tag comparator including a first comparator, wherein the first comparator compares a first portion of a tag with a first portion of a cancel identifier, a second comparator, wherein the second comparator compares a second portion of the tag with a second portion of said cancel identifier, and a cancel signal coupled to an output of the first comparator and an output the second comparator.

The present invention further contemplates a wrap-around buffer comprising a plurality of storage elements and a cancel tag comparator. Each of the storage elements stores a tag. The cancel tag comparator includes a first comparator, wherein the first comparator compares a portion of one of the tags with a portion of a cancel identifier, a second comparator, wherein the second comparator compares a portion of one of the tags with a portion of a cancel identifier, and a cancel signal coupled to an output of the first comparator and an output the second comparator wherein the cancel signal causes one of the tags to be canceled.

The present invention further contemplates a method of canceling buffer entries which includes the steps of comparing a first portion of a tag with a first portion of a cancel tag, comparing a second portion of a tag with a second portion of a cancel tag, and activating a cancel signal. The cancel signal is activated if the second portion of the tag and the second portion of the cancel tag are the same, and the first portion of the tag is greater-than the first portion of the cancel tag; or the second portion of the tag and the second portion of the cancel tag are different, and the first portion of the tag is less-than the first portion of the cancel tag.

BRIEF DESCRIPTION OF THE DRAWINGS

Other objects and advantages of the invention will become apparent upon reading the following detailed description and upon reference to the accompanying drawings in which.

Figure 1:
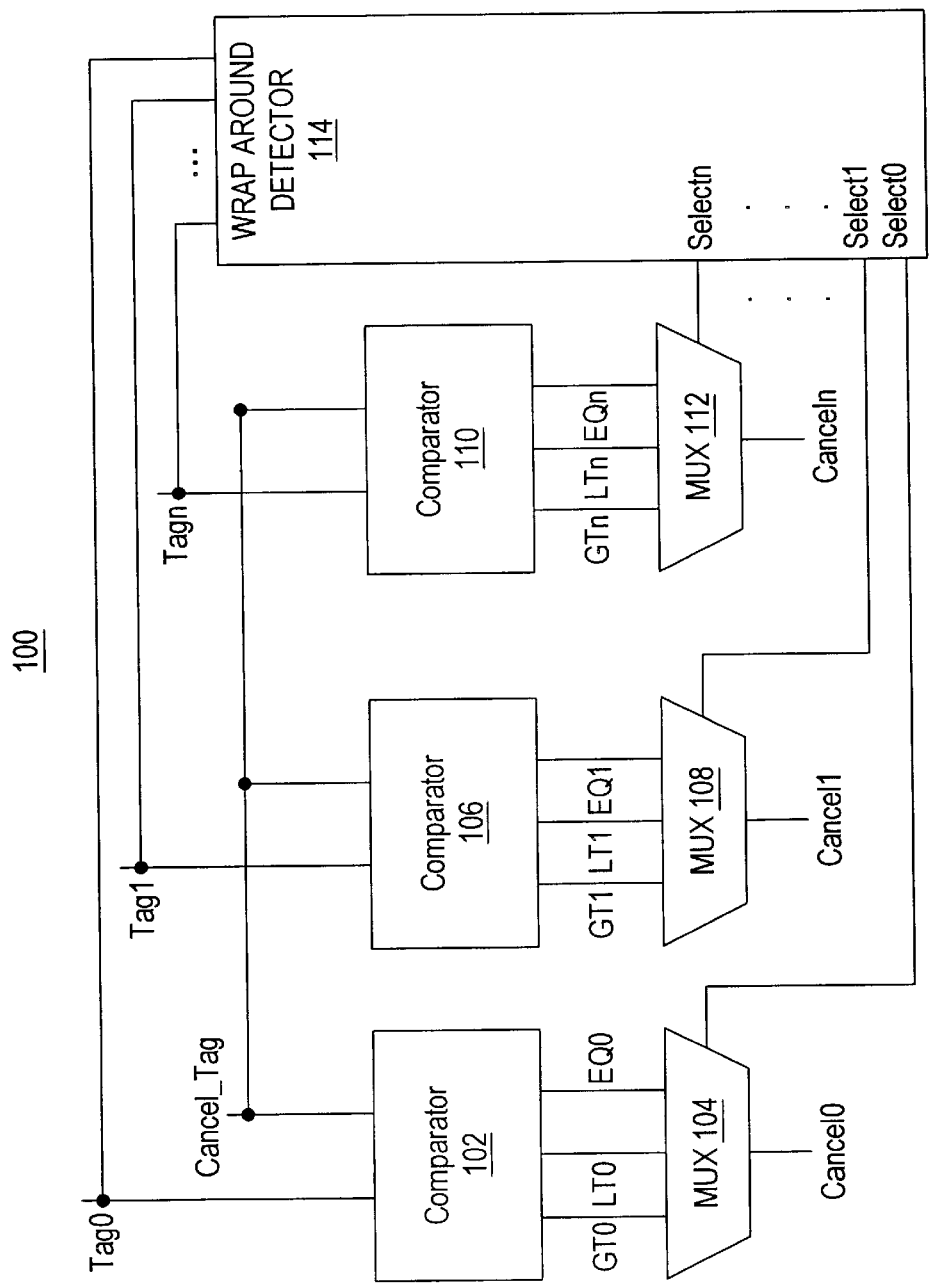
FIG. 1 is a block diagram of a conventional cancel tag comparator.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawings, FIG. 1 is a block diagram of a conventional cancel tag comparator. Cancel tag comparator 100 includes comparators 102, 106 and 110, a wrap-around detector 114, and multiplexers 104, 108 and 112.

Comparators 102, 106 and 110 compare a tag to a cancel tag. The outputs of comparators 102, 106 and 110 indicate whether the tag is greater-than or less-than the cancel tag. Wrap-around detector 114 compares all the tag inputs to detect a wrap-around condition. Wrap-around detector 114 sends multiplexer 104, 108 and 112 a signal to select either the greater-than or less-than output in dependence on the existence and location of a wrap-around condition.

If wrap-around detector 114 detects a wrap-around condition, the tags before the wrap-around are canceled if they are greater-than the cancel tag; and the tags after the wrap-around condition are canceled if they are less-than the cancel tag. For example, if tags Tag0–Tag10 store tag values from 9 to 3 (i.e. 9, A (10 decimal), B (11 decimal), C (12 decimal), D (13 decimal), E (14 decimal), F (15 decimal), 0, 1, 2 and 3) and the cancel tag is E, then wrap-around detector 114 will detect the wrap-around condition between Tag6 and Tag7.

In the above example, Tag0 has a value of 9. Tag0 is compared to the cancel tag with a value of E by comparator 102. Because Tag0 is less than the cancel tag (9 is less than E), the less-than output of comparator 102 is activated and the greater-than output is deactivated. Because Tag0 is before the wrap-around condition, wrap-around detector 114 sends a signal to multiplexer 104 to select the greater-than output of comparator 102. Multiplexer 104 couples Cancel0 to the greater-than output. Therefore, Cancel0 is deactivated and Tag0 is not canceled. In a similar manner, Tag1 (value of A) is less than the cancel tag and before the wrap-around condition. Therefore Cancel1 is coupled to the greater-than output, which is deactivated, and Tag1 is not canceled. Tag2, Tag3, and Tag4 (values B–D) operate in a similar manner.

Tag5 (value of E) is equal to the cancel tag. Therefore, the less-than and greater-than outputs of the associated comparator is deactivated. Because Tag5 is before the rollover, the greater-than output is selected and Tag5 is not canceled.

Tag6 (value of F) is greater than the cancel tag. Therefore, the greater-than output of the associated comparator is activated and the less-than output is deactivated. Wrap-around detector 114 selects the greater-than output of the associated comparator. Because Tag6 is before the wrap-around condition, Cancel6 is activated and Tag6 is canceled.

Tag7 (value of 0) is less than the cancel tag value. Therefore, the greater-than output of the associated comparator is deactivated and the less-than output is activated. Wrap-around detector 114, however, will select the less-than output of the associated comparator because the tag is after the wrap-around condition. Therefore, Cancel7 is activated and Tag7 is canceled. Tag8, Tag9, and Tag10 (values 1–3) operate in a similar manner.

Figure 2:
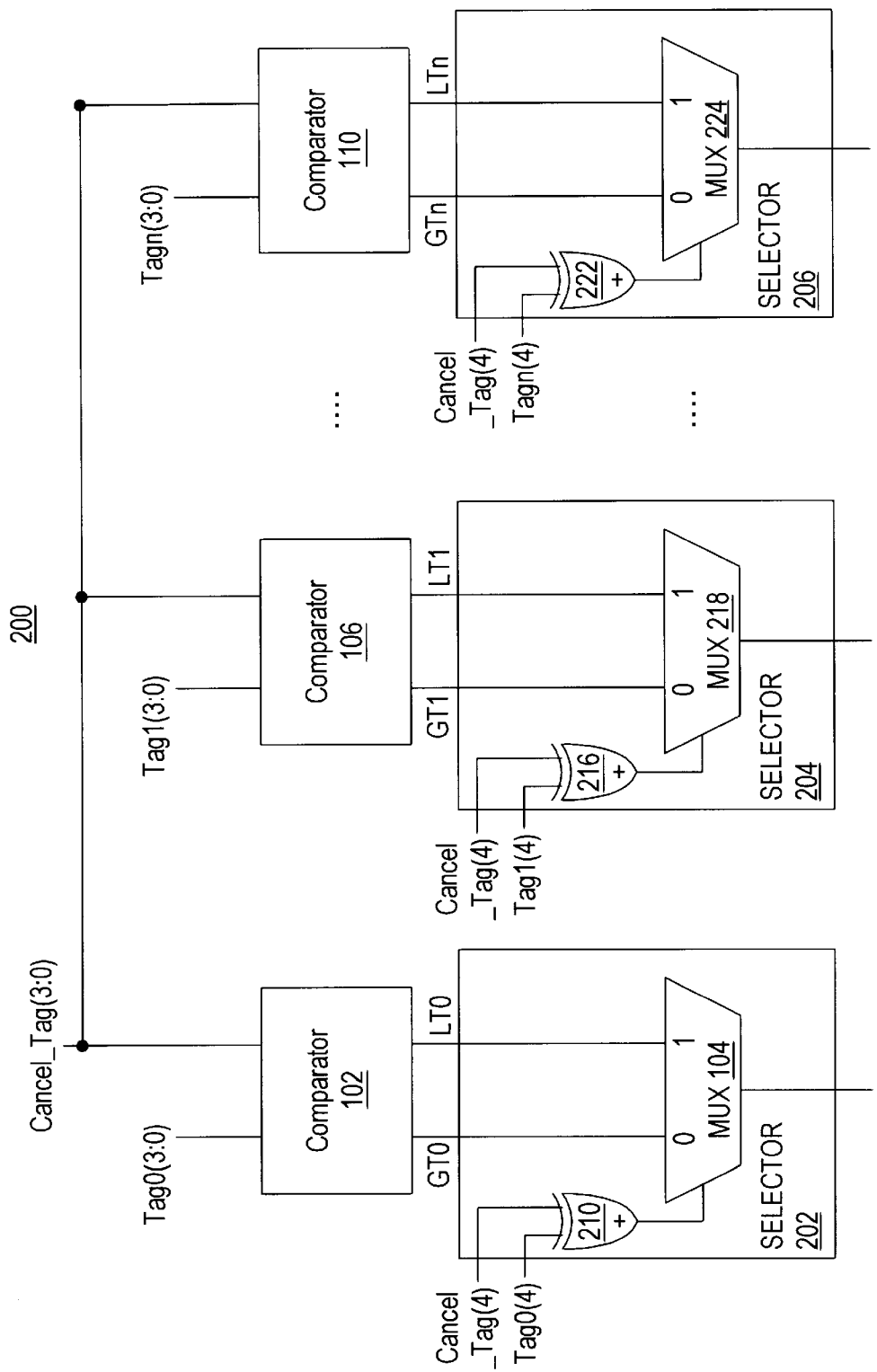
FIG. 2 is a block diagram of an improved cancel tag comparator.

Referring now to FIG. 2, cancel tag comparator 200 includes comparators 102, 106 and 110 and selectors 202, 204 and 206. Selector 202 includes exclusive-or gate 210 and multiplexer 212. Selector 204 includes exclusive-or gate 216 and multiplexer 218. Selector 206 includes exclusive-or gate 222 and multiplexer 224.

An additional bit is added to the tags and cancel tag of comparator 200. For example, for a sixteen entry buffer, a five-bit tag rather than a four-bit tag is used. The additional bit, which is the most significant bit, is toggled when a wrap-around condition occurs. The lower four-bits of the tag are the same as the four-bits described above with reference to FIG. 1. Thus, if the entries in the buffer are 9 through 3. The five-bit tag values will be 09, 0A, 0B, 0C, 0D, 0E, 0F, 10, 11, 12 and 13; or 19, 1A, 1B, 1C, 1D, 1E, 1F, 00, 01, 02 and 03. Because the buffer is limited to sixteen entries, there can only be one instance of a wrap-around in the buffer. The most significant bit is used to determine whether an entry is before or after the wrap-around. This eliminates the need for wrap-around detector 114.

Comparators 102, 104 and 106 operate in substantially the same manner described above with reference to FIG. 1. The lower bits of each tag are compared to the lower bits of the cancel tag. The greater-than and less-than outputs are activated and deactivated in dependence on the values of the lower bits of the tag and the lower bits of the cancel tag.

The most significant bit of the tag and the most significant bit of the cancel tag are compared by exclusive-or gates 210, 216 and 222. If the bits are the same, then no wrap-around condition has occurred and the greater-than output of the associated comparator is selected. If the bits are different, then a wrap-around condition has occurred and the less-than output is selected.

For example, if the tags range for 09 to 13 (i.e. 09, 0A, 0B, 0C, 0D, 0E, 0F, 10, 11, 12 and 13) and the cancel tag is 0E. Tag0 has a value of 09. The lower four-bits of Tag0 (value of 9) are compared to the lower four-bits of the cancel tag (value of E) by comparator 102. Because the lower four-bits of Tag0 is less than the lower four-bits of the cancel tag (9 is less than E), the less-than output of comparator 102 is activated and the greater-than output is deactivated. The most significant bit of Tag0 is compared to the most significant bit of the cancel tag by exclusive-or gate 210. Because these bits are both 0, the output of exclusive-or gate 210 is 0. Multiplexer 212, therefore, couples the greater-than output to Cancel0. Because Cancel0 is deactivated, like the greater-than output of comparator 102, Tag0 is not canceled. In a similar manner, the lower four-bits of Tag1 (value of A) is less than the lower four-bits of the cancel tag, and the most significant bits are both 0. Therefore Cancel1 is deactivated, and Tag1 is not canceled. Tag2, Tag3, and Tag4 (values 0B–0D) operate in a similar manner.

The lower four-bits of Tag5 (value of E) are equal to the lower four-bits of the cancel tag. Therefore, the less-than and greater-than outputs of the associated comparator will be deactivated. Because the most significant bit of both Tag5 and the cancel tag are 0, the greater-than output will be coupled to Cancel5 and Tag5 will not be canceled.

The lower four-bits of Tag6 (value of F) are greater than the lower four-bits of the cancel tag. Therefore, the greater-than output of the associated comparator will be activated and the less-than output will be deactivated. Because the most significant bit of Tag6 and the most significant bit of the cancel tag are both 0, the greater-than output will be coupled to Cancel6 and Tag6 will be canceled.

The lower four-bits of Tag7 (value of 0) are less than the lower four bit of the cancel tag. Therefore, the greater-than output of the associated comparator will be deactivated and the less-than output will be activated. The most significant bits, of Tag7 and the cancel tag, however, are different. The most significant bit of Tag7 is 1 and the most significant bit of the cancel tag is 0. Therefore, the output of the associated exclusive-or gate is 1, and the associated multiplexer will couple the less-than output to Cancel7. Therefore, Cancel7 will be activated and Tag7 will be canceled. Tag8, Tag9, and Tag 10 (values B–D) operate in a similar manner.

It is apparent that the less-than input to multiplexers 212, 218 and 224 could be replaced by an inverted version of the greater-than output. In this embodiment, the design of the comparators is simplified, but an additional gate delay is introduced, i.e., the gate that inverts the greater-than output.

Figure 3:
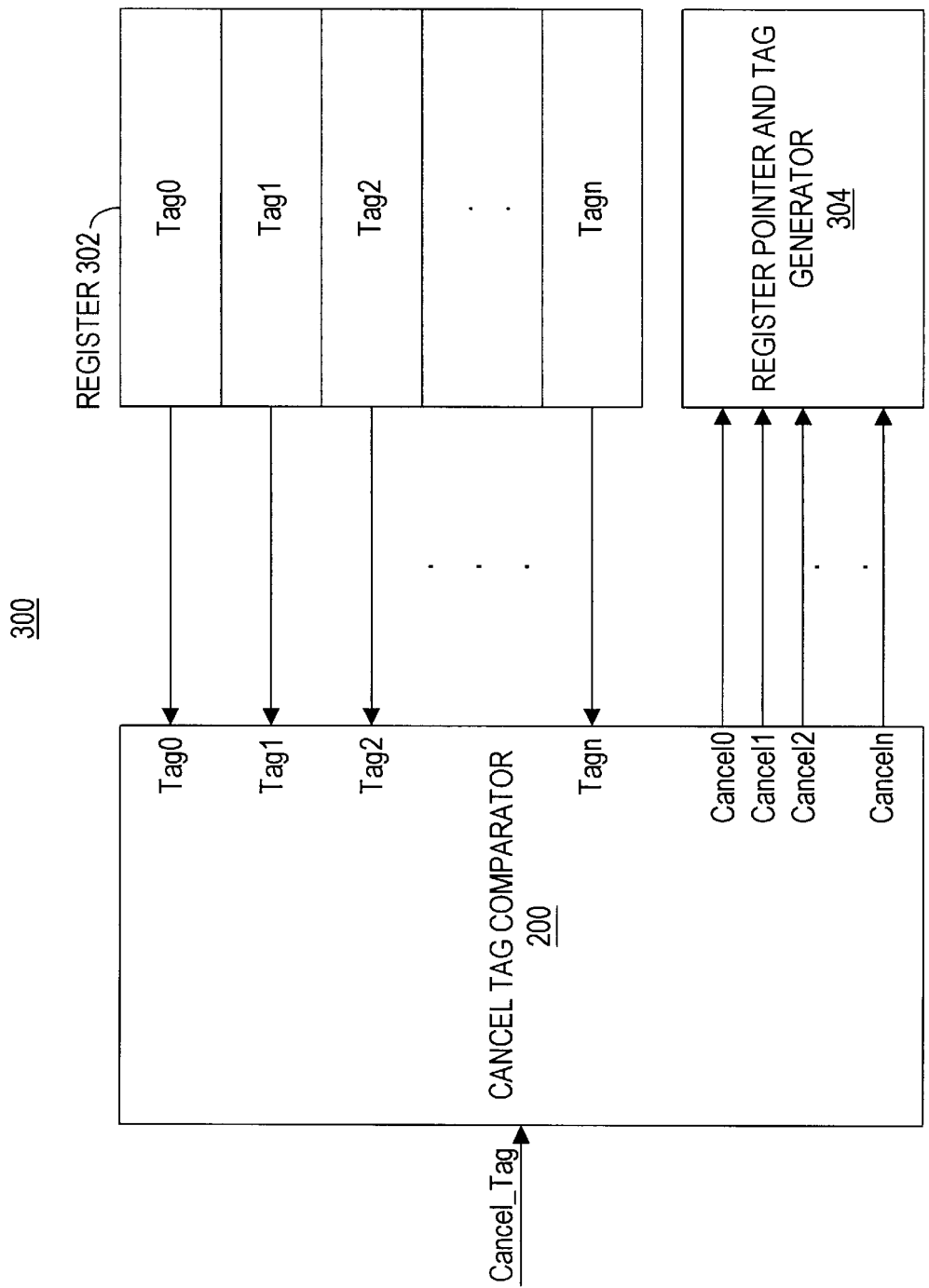
FIG. 3 is a block diagram of a finite wrap-around buffer including an improved cancel tag comparator.

FIG. 3 is a block diagram of a finite wrap-around buffer 300 including an improved cancel tag comparator. Buffer 300 includes register 302, cancel tag comparator 200, and register pointer and tag generator 304. Register 302 includes a plurality of data storage elements. Each data storage element stores a tag. Register pointer 304 points to the next tag to which data will be stored. For example, if data is stored in Tag0, Tag1, Tag2 and Tag3, then register pointer 304 points to Tag4. Register pointer 304 receives cancel inputs from cancel tag comparator 200. The cancel inputs delete the canceled tags from the list of tags to which a data is stored. For example, if data is stored in Tag0, Tag1, Tag2 and Tag3, register pointer 304 points to Tag4. If Tag2 and Tag3 are canceled, register pointer 304 would then point to Tag2. Pointing to Tag2 causes the next data to be written to Tag2, effectively canceling the data in Tag2 and Tag3. In one embodiment, the state of register pointer 304 is changed by pointing register pointer 304 to the first canceled tag. In the example above, Tag2 and Tag3 are canceled, therefore, register pointer 304 would be pointed to Tag2.

It is apparent that register pointer 304 may point to other tags. For example, register pointer 304 may point to the last tag to which data was stored rather than the next tag to which data will be stored.

The cancel inputs received from cancel tag comparator 200 also cause tag generator 304 to generate a tag value. In one embodiment, tag generator 304 is a five-bit incrementor. Tag generator 304 is decremented by the number of tags that are canceled. For example, if Tag0–Tag4 hold tag values of 03–07, then tag generator would have a value of 07. If Tag3 and Tag4 are canceled, tag generator 304 would be decremented by 2, i.e. tag generator 304 would have a value of 05. Therefore, the next tag value would be 06.

Cancel tag comparator 200 operates in substantially the same manner as described above with reference to FIG. 2. Cancel tag comparator receives a cancel tag, and compares that cancel tag to the tags inputs from register 302. The appropriate cancel signals are sent to register pointer and tag generator 304.

In one embodiment, a wrap-around buffer and cancel tag comparator are used in an instruction cache. The buffer stores branch tags used for branch prediction. When a misprediction occurs the mispredicted tag becomes the cancel tag, and all tags greater than the mispredicted tag are canceled from the buffer.

Numerous variations and modifications will become apparent to those skilled in the art once the above disclosure is fully appreciated. It is intended that the following claims be interpreted to embrace all such variations and modifications.

What is claimed is:

1. A wrap-around buffer comprising:
    a plurality of storage elements wherein each of said storage elements is configured to store one or more tags, wherein a first of said tags includes a tag portion and a roll-over bit, and said rollover bit is toggled when said tag portion wraps around; and
    a cancel tag comparator coupled to said plurality of storage of elements, and configured to receive said first tag and a cancel tag, and configured to output a cancel signal that identifies one or more of said tags to cancel, wherein said cancel tag comparator includes;
        a first comparator configured to compare said tag portion of said first tag with a tag portion of said cancel tag;
        a second comparator configured to compare said rollover bit of said first tag with a roll-over bit of said cancel tag, wherein said second comparator determines if a wrap-around condition has occurred; and
        a cancel signal conductor coupled to said fist comparator and said second comparator and configured to output said cancel signal in dependence upon an output of said first comparator and an output of said second comparator.

2. The wrap-around buffer as recited in claim 1 further comprising a buffer pointer wherein said cancel signal changes the state of said buffer pointer.

3. The wrap-around buffer as recited in claim 2 wherein said cancel signal changes the state of said buffer pointer to point to a storage element associated with said cancel tag.

4. The wrap-around buffer as recited in claim 2 further comprising a tag generator wherein said cancel signal changes the state of said tag generator.

5. The wrap-around buffer as recited in claim 1 wherein said first comparator has a plurality of outputs and said second comparator determines which of said plurality of outputs of said first comparator is coupled to said cancel signal.

6. The wrap-around buffer as recited in claim 5 wherein said outputs of said first comparator indicate that said tag portion of said first tag is greater-than or less-than said tag portion of said cancel tag.

7. The wrap-around buffer as recited in claim 5 wherein said outputs of said first comparator are coupled to inputs of a multiplexer, said output of said second comparator is coupled to a select input of said multiplexer, and an output of said multiplexer is coupled to said cancel signal.

8. The wrap-around buffer as recited in claim 7 wherein said less-than output of said first comparator is coupled to a first input of said multiplexer and said greater-than output of said first comparator is coupled a second input of said multiplexer.

9. The wrap-around buffer as recited in claim 1 wherein said second comparator is an exclusive-or gate.

10. A method of canceling buffer entries in a wrap-around buffer comprising:
    comparing a tag portion of a tag associated with a buffer entry with a tag portion of a cancel tag;
    comparing a rollover bit of said tag with a rollover bit of said cancel tag to determine if a wrap-around condition has occurred;
    activating a cancel signal if;
        said rollover condition does not occur and said tag portion of said tag is greater-than said tag portion of said cancel tag; or
        said rollover condition occurs and said tag portion of said tag is less-than said tag portion of said cancel tag, wherein said cancel signal identifies one or more buffer entries to cancel.

11. The method of canceling buffer entries as recited in claim 10 further comprising the step of changing the state of a buffer pointer in dependence on said cancel signal.

12. The method of canceling buffer entries as recited in claim 10 wherein a rollover condition occurs if said rollover bit of said tag and said rollover bit of said cancel tag are different.

13. The method of canceling buffer entries as recited in claim 10 wherein a rollover condition does not occur if said rollover bit of said tag and said rollover bit of said cancel tag are the same.

14. The method of canceling buffer entries as recited in claim 10 wherein said comparison of said rollover bits is an exclusive-or operation.

* * * * *